United States Patent
Hecht

[11] Patent Number: 6,158,928
[45] Date of Patent: Dec. 12, 2000

[54] CUTTING TOOL ASSEMBLY AND A CUTTING INSERT FOR USE THEREIN

[75] Inventor: Gil Hecht, Hadera, Israel

[73] Assignee: Iscar Ltd., Migdal Tefen, Israel

[21] Appl. No.: 09/301,312

[22] Filed: Apr. 29, 1999

[30] Foreign Application Priority Data

Apr. 29, 1998 [IL] Israel .......................................... 124282

[51] Int. Cl.$^7$ ............................................................ B26D 1/00
[52] U.S. Cl. ........................ 407/102; 103/104; 103/106; 103/113
[58] Field of Search .................................. 407/102, 103, 407/104, 106, 107, 113; 83/840, 698.31, 698.91, 844

[56] References Cited

U.S. PATENT DOCUMENTS

| | | | |
|---|---|---|---|
| 3,289,272 | 12/1966 | Stier | 407/104 X |
| 3,925,868 | 12/1975 | Singh | 407/104 X |
| 3,973,309 | 8/1976 | Kummer | 407/104 X |
| 4,083,643 | 4/1978 | Friedline | 407/104 |
| 4,398,853 | 8/1983 | Erickson | 407/104 |
| 4,575,292 | 3/1986 | Berti | 409/234 |
| 4,632,593 | 12/1986 | Stashko | 407/104 X |
| 5,004,378 | 4/1991 | Arai et al. | 407/104 X |
| 5,199,827 | 4/1993 | Pantzar | 407/114 X |
| 5,607,263 | 3/1997 | Nespeta et al. | 407/61 |

FOREIGN PATENT DOCUMENTS

| | | |
|---|---|---|
| 33 01 191 A1 | 7/1984 | Germany . |
| 265579 | 3/1950 | Switzerland . |
| WO 98/50187 | 11/1998 | WIPO . |

*Primary Examiner*—M. Rachuba
*Attorney, Agent, or Firm*—Pennie & Edmonds LLP

[57] ABSTRACT

A cutting tool assembly having a longitudinal axis comprises a cutting insert (3) to be releasably retained in a tool holder (1). The cutting insert (3) is formed with a through bore (21) having spaced apart, peripherally located, radially directed support wings (22). The tool holder (1) is provided with a coupling member (11) having a plurality of corresponding radially extending abutment wings (15). The coupling member (11) of the tool holder (1) is rotatable and axially displaceable with respect thereto. The releasable retaining of cutting insert (3) in the tool holder (1) is effected by the insertion of the coupling member (11) of the tool holder (1) into the through bore (21) of the cutting insert (3) with the abutment wings (15) passing between and beyond successive support wings (22), rotating the coupling member (11) so that the abutment wings (15) are aligned with and overlay the support wings (22) whilst axially displacing the coupling member (11) until the abutment wings (15) clampingly abut the support wings (22).

23 Claims, 4 Drawing Sheets

CUTTING TOOL ASSEMBLY AND A CUTTING INSERT FOR USE THEREIN

FIELD OF THE INVENTION

The present invention relates to a cutting tool assembly of the kind having a replaceable cutting insert.

BACKGROUND OF THE INVENTION

Such cutting tool assemblies have long been known particularly where the cutting insert is replaceably retained in or on a tool holder by screw clamping. With most of such known assemblies handling difficulties are often encountered when removing or replacing the cutting insert, seeing that this usually involves loosening, removal and screw insertion of the clamping screw, whilst at the same time holding the cutting insert.

In our co-pending WO 98/50187, there is provided a cutting tool comprising a cutting insert and a tool holder in which the cutting insert is releasably retained. The cutting insert has a peripheral cutting portion and a central coupling portion constituted by a through bore formed in the body of the cutting insert, the through bore having a plurality of spaced apart, peripherally located, radially directed support wings. The tool holder has a coupling member mounted therein so as to be axially displaceable with respect thereto, the coupling member having a corresponding plurality of radially extending abutment wings for interacting with the support wings of the cutting insert. The cutting tool is assembled by the insertion of the coupling member of the tool holder into the cavity of the cutting insert with the abutment wings passing respectively between successive support wings, rotating the cutting insert relative to the tool holder until the abutment wings overlay the support wings and axially displacing the coupling member of the tool holder in the inward direction thereof until the abutment wings clampingly abut the support wings.

It is an object of the present invention to provide a new cutting tool assembly of the kind disclosed in the co-pending patent application.

SUMMARY OF THE INVENTION

According to one aspect of the present invention, there is provided a cutting tool assembly having a longitudinal axis and comprising a cutting insert to be releasably retained in a tool holder, said cutting insert being formed with a through bore having spaced apart, peripherally located, radially directed support wings; said tool holder being provided with a coupling member having a plurality of corresponding radially extending abutment wings for interacting with the support wings of the cutting insert, said coupling member of the tool holder being rotatable and axially displaceable with respect thereto, the arrangement being such that a retaining coupling of said cutting insert to said tool holder is effected upon insertion of the coupling member of the tool holder into the through bore of the cutting insert with said abutment wings passing between and beyond successive support wings, rotating said coupling member so that said abutment wings are aligned with and overlay said support wings whilst axially displacing said coupling member until said abutment wings clampingly abut said support wings.

Preferably, the cutting tool assembly is further provided with displacing means for the rotation and inward and outward axial displacement of said coupling member of the tool holder. Such displacement means may, for example, be in the form a screw threadingly mounted in said tool holder so as to act on said coupling member, whereby rotation of said screw in opposite senses results in said rotation of the coupling member of the tool holder and said inward and outward axial displacements thereof.

In accordance with another aspect of the present invention, there is provided a cutting insert for releasable mounting on a tool holder having a coupling member formed with a radially extending abutment wings, said cutting insert having a substantially polygonal shape and a through bore formed with corresponding peripherally located and radially directed support wings which are so spaced apart as to enable a free passage of said abutment wings therebetween.

BRIEF DESCRIPTION OF DRAWINGS

For a better understanding of the present invention and to show how the same may be carried out in practice, there will now be described a cutting tool assembly in accordance with the present invention, with reference to the accompanying drawings, in which.

DETAILED DESCRIPTION OF A PREFERRED EMBODIMENT

Figure 1:
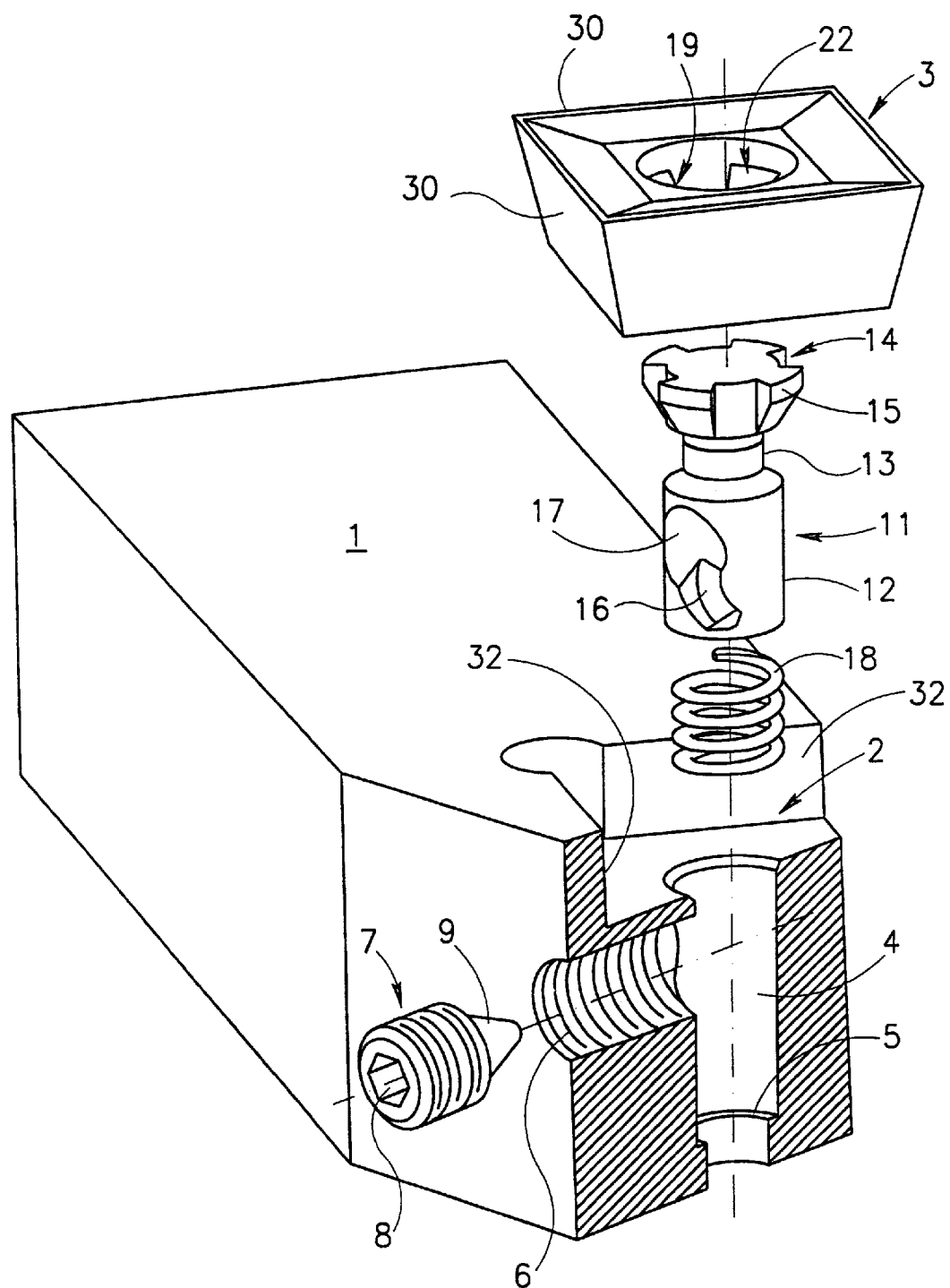
FIG. 1 is an exploded perspective view of a cutting tool assembly in accordance with the invention, with a tool holder thereof shown transversely sectioned.
Figure 2:
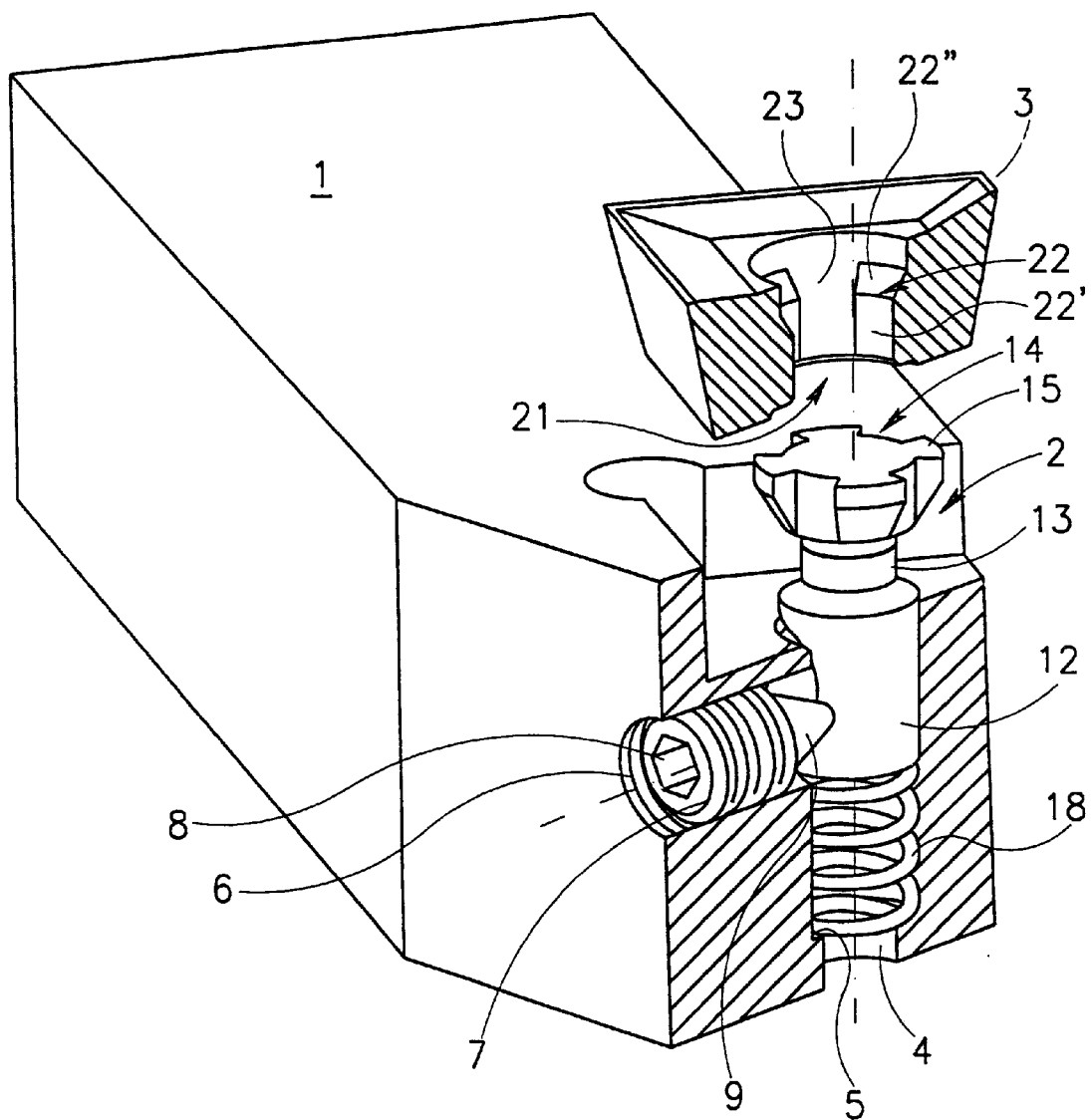
FIGS. 2, 3 and 4 show the tool assembly shown in FIG. 1 in successive stages of coupling and clamping of a cutting insert to the tool holder, the cutting insert and the tool holder being shown transversely sectioned.
Figure 3:
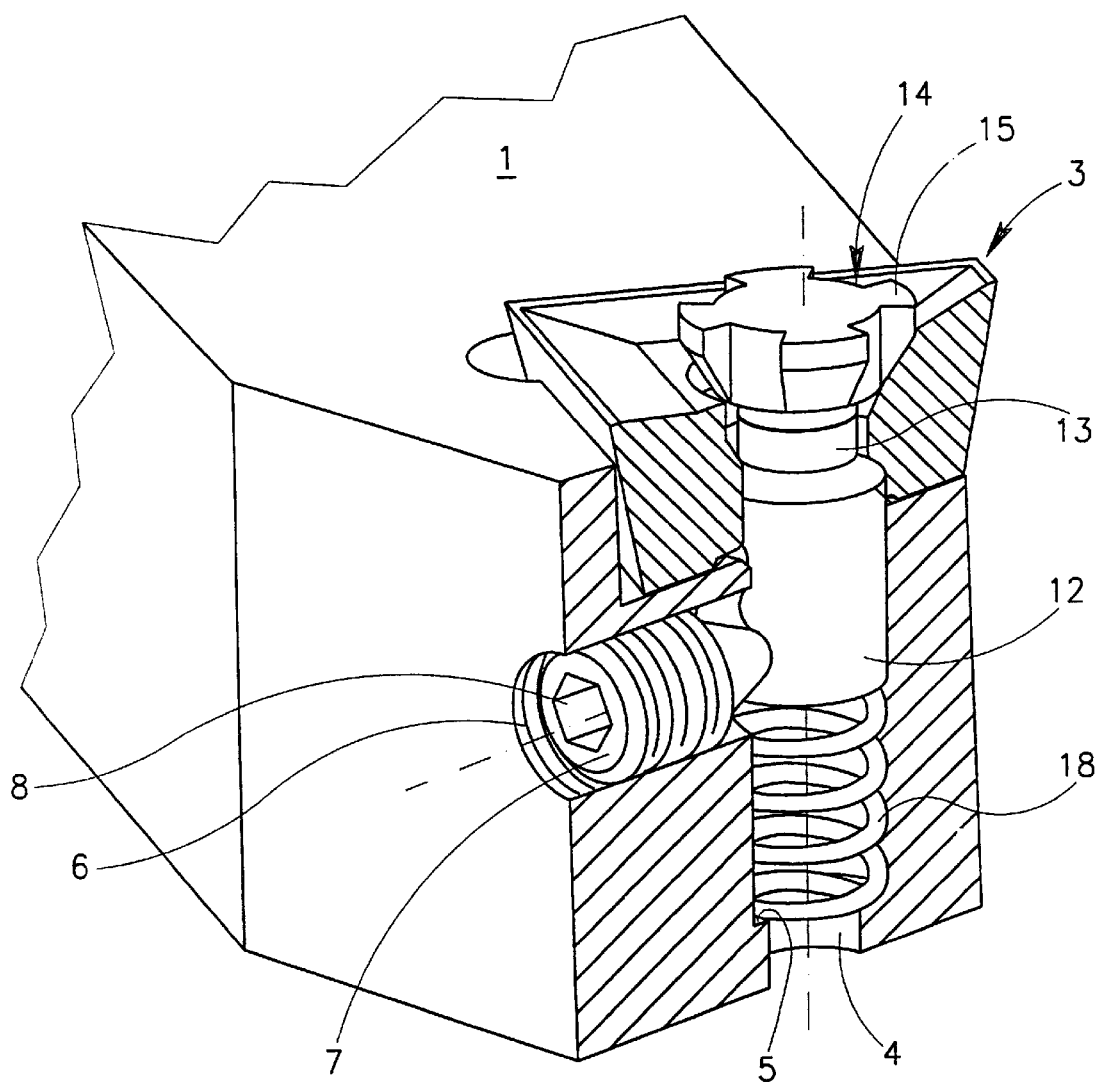
Figure 4:
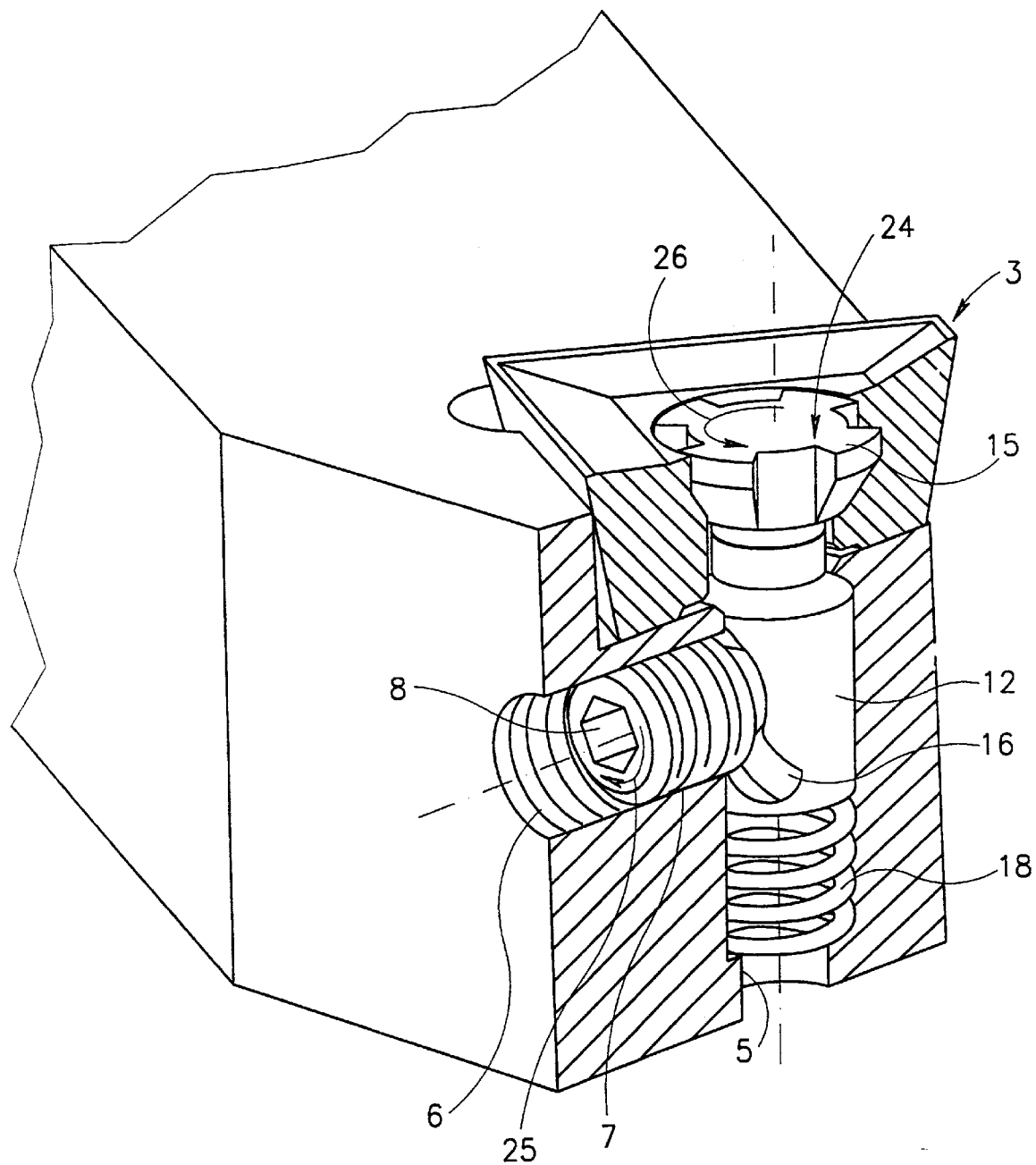

As seen in FIGS. 1 to 4 of the drawings, the cutting tool assembly comprises a tool holder 1 in which is formed a square cutting insert receiving pocket 2 adapted to receive a cutting insert 3 of correspondingly square shape. The cutting insert is retained by means of a clamping mechanism to be described below.

Extending downwardly through the tool holder 1 and opening out into the pocket 2 is a cylindrical bore 4 having at its lowermost end a shoulder 5. Extending laterally through the tool holder 1 is a threaded bore 6 which opens into the cylindrical bore 4.

A displacing screw 7, to be threadingly engaged within the threaded bore 6, is formed at one end thereof with a hexagonal driving recess 8 and, at the opposite end thereof, with a conically shaped tip 9.

An elongated coupling member 11 comprises a cylindrical body portion 12 formed integrally via a narrow neck portion 13 with an end coupling portion 14 having a plurality of radially extending, equi-angularly distributed abutment wings 15. The wings 15 are in the form of protrusions tapering inwardly towards the neck portion 13.

A groove 16 is formed in the body portion 12. The groove 16 extends spirally upwards toward the neck portion 13, whilst broadening and deepening. The spiral groove 16 merges at its end adjacent the narrow neck portion 13 with an enlarged, conically shaped locking recess 17. The tool assembly furthermore comprises a biasing compression spring 18.

The cutting insert 3 has a peripheral cutting portion with four indexable cutting edges and a coupling element 19 defining a centrally-located through bore 21 having a plurality of spaced apart peripherally located axially extending radially-directed support wings 22 which are set downwardly with respect to the upper surface 20 of the cutting insert 3 and which are respectively separated from each other by throughgoing channel ways 23. Each wing 22 has an axially extending lower portion 22' merging with an upper portion 22" which tapers outwardly and upwardly towards the upper surface 20.

Prior to mounting a cutting insert in the tool holder the clamping mechanism has to be assembled. Once assembled, it remains in place for retaining and releasing a cutting insert.

The clamping mechanism is assembled as follows:

The compression spring 18 is introduced into the cylindrical bore 4 so as to rest on the shoulder 5. Following this, the coupling member 11 is inserted into the cylindrical bore 4 to rest on the compression spring 18, with the end coupling portion 14 of the coupling member 11 projecting above the insert receiving pocket 2, and with the groove 16 being disposed opposite the threaded bore 6. In this position, the displacing screw 7 is threadingly inserted into the threaded bore 6 so that its conical tip 9 enters the lowermost end of the spiral groove 16.

In this position, the coupling portion 14 is oriented such that on placing the cutting insert 3 in the insert receiving pocket 2 the abutment wings 15 of the coupling member 11 are aligned with the channel ways 23 of the cutting insert 3.

Mounting and clamping of the cutting insert 3 takes place as follows:

As the cutting insert 3 is placed in position in the pocket 2 the radially extending abutment wings 15 of the coupling member 11 pass through and beyond the channel ways 23.

The displacing screw 7 is now rotated in a clockwise direction as shown by the arrow 25, so that it progresses inwardly towards the coupling member 11. Then by virtue of the location of the conical tip 9 of the displacing screw 7 within the spiral groove 16, there is imparted to the coupling member 11 an anti-clockwise rotational displacement as shown by the arrow 26 sufficient to displace the abutment wings 15 from above the channel ways 23 into a position wherein they are superimposed above the upper portion 22" of the support wings 22 of the cutting insert 3.

At the same time, the rotation of the coupling member 11 is accompanied by a downwardly-directed axial displacement, as a result of which the cutting insert 3 is clamped within the pocket 2 by virtue of downwardly-directed forces applied by the abutment wings 15 on the upper portion 22" of the support wings 22.

As the displacing screw 7 further progresses inwardly its conical tip 9 finally passes from the spiral groove 16 into the locking recess 17, whereby the cutting insert 3 is lockingly clamped in the tool holder 1.

Release of the cutting insert 3 from the tool assembly takes place by a reverse action. Thus, rotating the displacing screw 7 in an anti-clockwise direction results in the outward displacement of the screw tip 9 from the locking recess 17, releasing the coupling member 11 for upward displacement under the influence of the biasing spring 18. Seeing that the conical tip 9 of the displacement screw 7 is now located in the spiral groove 16, the upward displacement of the coupling member 11 under the influence of the spring 18 is accompanied by a limited rotation of the coupling element, now in a clockwise direction, thereby displacing the abutment wings 15 of the coupling member 11 into a position aligned with and beyond the channel ways 23 of the cutting insert 3 and freeing the cutting insert so that it can be removed from the insert receiving pocket 2.

It should be noted that when the cutting insert 3 is placed in the insert receiving pocket 2 it is prevented from rotation relative to the tool holder 1 by virtue of the interaction of the cutting insert's adjacent side surfaces 30 with corresponding positioning side walls 32 of the pocket 2.

The cutting tool assembly and the cutting insert according to the present invention may have features different from those described above and shown in the drawings. Thus, for example, the cutting insert does not need to be square but it may have any other polygonal shape. The tool holder may be of any design suitable for a chosen application. The displacement means may also be of any other appropriate design providing the axial and rotational displacement of the coupling member of the tool holder.

I claim:

1. A cutting tool assembly having a longitudinal axis and comprising a cutting insert to be releasably retained in a tool holder, said cutting insert being formed with a through bore having spaced apart, peripherally located, radially directed support wings, said tool holder being provided with a coupling member having a plurality of corresponding radially extending abutment wings for interacting with the support wings of the cutting insert, said coupling member of the tool holder being rotatable and axially displaceable with respect to the toolholder, wherein a retaining coupling of said cutting insert to said tool holder is effected upon insertion of the coupling member of the tool holder into the through bore of the cutting insert with said abutment wings passing between and beyond successive support wings, rotating said coupling member so that said abutment wings are aligned with and overlay said support wings whilst axially displacing said coupling member until said abutment wings clampingly abut said support wings.

2. A cutting tool assembly according to claim 1, further provided with displacing means for the rotation and inward and outward axial displacement of said coupling member of the tool holder.

3. A cutting tool assembly according to claim 2, wherein said displacing means is a screw threadingly mounted in said tool holder so as to act on said coupling member, whereby rotation of said screw in opposite senses results in rotation of said coupling member of the tool holder in opposite senses and said inward and outward axial displacements thereof.

4. A cutting tool assembly according to claim 1, wherein said coupling member is upwardly biased by means of a compression spring.

5. A cutting tool assembly according to claim 1, wherein the cutting insert has a polygonal shape and said tool bolder has an insert receiving pocket of a corresponding shape.

6. A tool holder having an insert receiving pocket for releasably mounting therein a cutting insert having a through bore formed with peripherally located and radially directed spaced apart support wings, the tool holder having an elongated coupling member having a body portion disposed in the tool holder and an end coupling portion integrally formed with the body portion and projecting into said insert receiving pocket, said end coupling portion being formed with radially extending abutment wings corresponding to said support wings and configured and dimensioned for free passage therebetween.

7. A tool holder according to claim 6, wherein said coupling member is upwardly biased by a compression spring.

8. A tool holder according to claim 6, further including a screw threadingly mounted in said tool holder so as to act on said body portion of the coupling member within the tool holder, whereby rotation of said screw in opposite senses results in said rotation of the coupling member of the tool holder in opposite senses and inward and outward axial displacements thereof.

9. A tool holder according to claim 8, wherein said coupling member of the tool holder is formed with a spiral groove and said screw has a screw tip capable of entering said groove and moving therealong upon the rotation of the screw.

10. The tool holder according to claim 8, wherein said screw is oriented transversely to said longitudinal axis.

11. A cutting tool assembly having a longitudinal axis and comprising a cutting insert to be releasably retained in a correspondingly shaped insert receiving pocket of a tool holder, said cutting insert being formed with a through bore having spaced apart, peripherally located, radially directed support wings; said tool holder being provided with an elongated coupling member axially extending therethrough and having a body portion disposed in the tool holder and an end coupling portion integrally formed with the body portion and projecting from said insert receiving pocket, said coupling portion being formed with a plurality of corresponding radially extending abutment wings for interacting with the support wings of the cutting insert receiving pocket by passing said coupling portion of the coupling member of the tool holder through the through bore of the cutting insert with said abutment wings passing between and beyond successive support wings, rotating and axially displacing said coupling member until the coupling member reaches a position in which said abutment wings are aligned with, overlay and clampingly abut said support wings.

12. A cutting tool assembly according to claim 11, further including a screw threadingly mounted in said tool holder so as to act on said body portion of the coupling member within the tool holder, whereby rotation of said screw in opposite senses results in said rotation of the coupling member of the tool holder in opposite senses and inward and outward axial displacements thereof.

13. A cutting tool assembly according to claim 12, wherein said screw is oriented transversely to said longitudinal axis.

14. A cutting tool assembly according to claim 12, wherein said coupling member of the tool holder is formed with a spiral groove and said screw has a screw tip capable of entering said groove and moving therealong upon the rotation of the screw.

15. A cutting tool assembly according to claim 14, wherein said groove terminates at a conically shaped locking recess adapted to receive therein said screw tip at a final stage of its movement along said groove, to ensure the locking of the cutting insert in the tool holder when the abutment wings clampingly abut the support wings.

16. A cutting tool assembly according to claim 11, wherein said coupling member is upwardly biased by a compression spring.

17. A cutting tool assembly according to claim 11, wherein the cutting insert has a polygonal shape.

18. A cutting tool assembly according to claim 11, wherein said coupling portion and said body portion merge via a neck portion which is substantially narrower than the coupling portion.

19. A tool holder assembly comprising:
a tool holder having an insert receiving pocket including a pocket base adapted to receive a cutting insert, a first bore formed in the pocket base and defining a longitudinal axis, and a second threaded bore formed in the tool holder which is oriented transversely to and is connected with the first bore;
a coupling member having a body portion provided with a groove extending at least partially therealong, the body portion sized to fit into said first bore, the coupling member also having an end coupling portion provided with a plurality of spaced-apart radially extending abutment wings; and
a screw configured and dimensioned to threadingly fit into said threaded bore; wherein
upon insertion of the coupling member body portion into the first bore and insertion of the screw into the second bore, rotation of the screw in a first rotation direction causes the screw to engage the groove of the coupling member, thereby urging the coupling member in a first axial direction further into the first bore and rotating the coupling member.

20. A tool holder assembly according to claim 19, further comprising:
a compression spring biasing the coupling member in a second axial direction opposite to said first axial direction.

21. A cutting tool assembly comprising:
a tool holder having an insert receiving pocket including a pocket base adapted to receive a cutting insert, a first bore formed in the pocket base and defining a longitudinal axis, and a second threaded bore formed in the tool holder which is oriented transversely to and is connected with the first bore;
a coupling member having a body portion provided with a groove extending at least partially therealong, the body portion being inserted into said first bore, the coupling member also having an end coupling portion projecting into the insert receiving pocket and being provided with a plurality of spaced-apart radially extending abutment wings;
a screw configured and dimensioned to threadingly fit into said threaded bore; and
a cutting insert formed with a through bore having spaced apart, peripherally located, radially directed support wings, the support wings configured and dimensioned to permit passage of the abutment wings therebetween, when the end coupling portion of the coupling member is inserted into the cutting insert's through bore; and wherein
the cutting insert and the coupling member are movable from a first position in which the abutment wings are disposed between the support wings, to a second position in which abutment wings clampingly abut the support wings and bias the cutting insert in a first axial direction towards the pocket base.

22. The cutting tool assembly of claim 21, further comprising
a compression spring biasing the coupling member in a second axial direction opposite said first axial direction.

23. The cutting tool assembly of claim 21, further comprising
a compression spring biasing the coupling member in a second axial direction opposite said first axial direction.

* * * * *